US012496991B2

(12) United States Patent
Pearson et al.

(10) Patent No.: US 12,496,991 B2
(45) Date of Patent: Dec. 16, 2025

(54) SIDE MOUNTED AIR SUPPLY FOR WHEEL LIFT INDEPENDENT OF VEHICLE AIR BRAKE

(71) Applicant: Exosent Engineering, LLC, Navasota, TX (US)

(72) Inventors: Gerald Pearson, College Station, TX (US); Yuval Doron, Navasota, TX (US); Manuel Gutierrez, Navasota, TX (US)

(73) Assignee: Exosent Engineering, LLC, Navasota, TX (US)

( * ) Notice: Subject to any disclaimer, the term of this patent is extended or adjusted under 35 U.S.C. 154(b) by 827 days.

(21) Appl. No.: 17/653,853

(22) Filed: Mar. 7, 2022

(65) Prior Publication Data
US 2022/0281396 A1    Sep. 8, 2022

Related U.S. Application Data

(63) Continuation of application No. 29/773,302, filed on Mar. 9, 2021, now Pat. No. Des. 1,036,311.
(Continued)

(51) Int. Cl.
*B60T 17/06* (2006.01)
*B60G 17/00* (2006.01)
(Continued)

(52) U.S. Cl.
CPC ............. *B60R 16/08* (2013.01); *B60G 17/00* (2013.01); *B60T 17/06* (2013.01); *B62D 63/08* (2013.01);
(Continued)

(58) Field of Classification Search
CPC ....... B60T 17/06; B60T 13/268; B62D 53/06; B62D 63/08; B62D 21/16; B62D 63/06;
(Continued)

(56) References Cited

U.S. PATENT DOCUMENTS 1,002,822 A * 9/1911 Cowles ..................... F16F 9/43
137/513.7
1,494,366 A * 5/1924 Mears ..................... B60T 17/06
280/833
(Continued)

FOREIGN PATENT DOCUMENTS

CN          103629113 B    1/2016
DE    102008034629 A1 *  4/2009    .............. B60T 17/06
(Continued)

OTHER PUBLICATIONS

DE102008034629A1 (Year: 2009).*
(Continued)

*Primary Examiner* — Thomas J Williams
(74) *Attorney, Agent, or Firm* — Definitive Patents member Synchrony IP; Tomothy D. Snowden; Yau H. Chan

(57) ABSTRACT

Apparatus and associated methods relate to a vehicle having independent fluid reservoirs for a fluid-activated brake system and at least one auxiliary fluid consumer. In an illustrative example, a first reservoir may be mounted above a chassis and outboard of a vehicle such that longitudinal axes of the reservoir and the vehicle are substantially aligned. The first reservoir may, for example, be fluidly coupled to a fluidly activated brake configured to brake at least one wheel on at least one axle of the vehicle and fluidly coupled to the first reservoir. At least one second reservoir may be fluidly coupled to at least one auxiliary fluid consumer of the vehicle such that the first reservoir is fluidly independent from the at least one second reservoir and the at least one auxiliary fluid consumer. Various embodiments may advantageously provide stable air supply for critical braking functions of the vehicle.

23 Claims, 7 Drawing Sheets

Related U.S. Application Data

(60) Provisional application No. 63/157,428, filed on Mar. 5, 2021.

(51) Int. Cl.
  *B60R 16/08* (2006.01)
  *B62D 63/06* (2006.01)
  *B62D 63/08* (2006.01)
  *B60T 13/26* (2006.01)

(52) U.S. Cl.
  CPC .... *B60G 2300/042* (2013.01); *B60G 2500/30* (2013.01); *B60T 13/268* (2013.01)

(58) Field of Classification Search
  CPC ............... B62D 63/062; B62D 63/068; B60G 2300/042
  USPC .............. 280/6.151, 423.1, 124.157, 124.16, 280/124.161; 303/123, 127, 85; 296/187.01, 193.01, 193.05
  See application file for complete search history.

(56) References Cited

U.S. PATENT DOCUMENTS

| | | | |
|---|---|---|---|
| 2,689,698 A * | 9/1954 | Agnew | B64D 37/02 |
| | | | 244/135 R |
| 2,704,989 A | 3/1955 | Theodore | |
| 2,903,272 A * | 9/1959 | Bordenkircher | B60G 17/033 |
| | | | 280/407.1 |
| 3,043,633 A * | 7/1962 | Hubscher | B60T 8/1843 |
| | | | 188/106 R |
| 3,219,275 A | 11/1965 | Green | |
| 3,613,915 A | 10/1971 | Vita | |
| 4,344,656 A * | 8/1982 | Masterson, Jr. | B60G 17/0408 |
| | | | 303/2 |
| 4,400,131 A * | 8/1983 | Blake | B60P 1/16 |
| | | | 406/137 |
| 4,501,437 A | 2/1985 | Becker | |
| D324,082 S | 2/1992 | Howard | |
| D351,432 S | 10/1994 | Dudeck et al. | |
| 6,149,246 A * | 11/2000 | Terborn | B60T 17/06 |
| | | | 280/124.16 |
| 7,530,577 B2 * | 5/2009 | Sandbulte | B60G 17/0523 |
| | | | 280/124.16 |
| 8,360,451 B2 | 1/2013 | Hammond | |
| D679,339 S | 4/2013 | Genovese | |
| D706,361 S | 6/2014 | Giovannone, Sr. | |
| D727,436 S | 4/2015 | Padilla | |
| 9,415,814 B1 * | 8/2016 | Swope | B60R 9/065 |
| D816,508 S | 5/2018 | McArdle et al. | |
| D873,671 S | 1/2020 | Altieri | |
| D903,005 S | 11/2020 | Ma | |
| D905,176 S | 12/2020 | Ramirez et al. | |
| D982,489 S | 4/2023 | Pearson et al. | |
| D994,540 S | 8/2023 | Doron et al. | |
| D1,012,199 S | 1/2024 | Vieth | |
| 2006/0038370 A1 | 2/2006 | Doerr et al. | |
| 2019/0152453 A1 | 5/2019 | Tober | |
| 2020/0096128 A1 | 3/2020 | Cervantez et al. | |
| 2022/0281396 A1 * | 9/2022 | Pearson | B62D 63/08 |

FOREIGN PATENT DOCUMENTS

| | | |
|---|---|---|
| DE | 102008018398 A1 | 10/2009 |
| JP | 2004058891 A * | 2/2004 |
| JP | 2009286312 A * | 12/2009 |
| JP | 2010241288 A * | 10/2010 |

OTHER PUBLICATIONS

Priority U.S. Appl. No. 29/773,302, filed Mar. 11, 2024, [Side Mounter Rockets, available in exosent.com, no date found [online], [site visited Feb. 2, 2024], https: exosent.com/rockets.

Priority U.S. Appl. No. 29/773,302, filed Mar. 11, 2024, exosent 11600, available in instagram.com, announced Sep. 18, 2020 [online], www.instagram.com/p/CFSUhB-JEhr/.

Complete Air Ride, Avs 2 Gallon Aluminum Tank—Raw, Complete Air Ride, Feb. 16, 2022, <https://www.completeairride.com/products/avs-2-gallon-aluminum-tank-raw>.

Daimler Trucks, Brake Systems, Daimler Trucks North America Feb. 16, 2022, <https://dtnacontent-dtna.prd.freightliner.com/content/public/dtna-servicelit/dtna/en_us/thomas-built-buses/drivers-manuals/saf-t-liner-c2-school-bus-drivers-manual/section_ch12dm466.html>.

Primo, A., This object is a fuel tank not a ballistic missile, Feb. 16, 2022, <https://verify-sy.com/en/details/1093/This-object-is-a-fuel-tank-not-a-ballistic-missile>.

Trailer Marketing, Air Tank For Dual Tank System | TMI Trailer Marketing, Inc., Feb. 9, 2022, <https://trailermarketing.com/product/air-tank-for-dual-tank-system/>.

Transport Resources, Pneumatic Tank Trailers for Lease | TRI, Transport Resources, Inc., Feb. 9, 2022, <https://transportresources.com/equipment/pneumatic-vacuum-pneumatic-tank-trailer/>.

Trucking Truth, Inspecting Air Brake Systems | High Road Online CDL Training, Feb. 16, 2022, <https://www.truckingtruth.com/cdl-training-program/page44/inspecting-air-brake-systems>.

Twisted Images, 32128-Seamless Tanks Aluminum Air Tank 28" Length 5.562, Twisted Images, Feb. 16, 2022, <https://www.twistedimages.com/Seamless-Tanks-Aluminum-Air-Tank-28-Length-5562-Diameter_p_482.html>.

* cited by examiner

SIDE MOUNTED AIR SUPPLY FOR WHEEL LIFT INDEPENDENT OF VEHICLE AIR BRAKE

CROSS-REFERENCE TO RELATED APPLICATIONS

This application is a Continuation-in-Part of and claims the benefit of U.S. Design Application Serial No. 29/773,302, titled "Projectile-Shaped Air Tank," filed by Pearson, et al., on Mar. 9, 2021.

This application also claims the benefit of U.S. Provisional Application Ser. No. 63/157,428, titled "Side Mounted Air Supply for Wheel Lift Independent of Vehicle Air Brake," filed by Pearson, et al., on Mar. 5, 2021.

This application incorporates the entire contents of the foregoing application(s) herein by reference.

TECHNICAL FIELD

Various embodiments relate generally to air supplies on portable structures.

BACKGROUND

Trailers have long been used to provide adaptable transport capabilities. Trailers may, for example, be connected to various vehicle types for transport of various types of cargo. Trailers may, for example, be adapted for residential, commercial, industrial, or mixed applications. Various trailers may be adapted for commercial use towed by dedicated trucks. Such combinations may be known, for example, as eighteen-wheelers, semi-trucks/semi-trailers, and/or tractor-trailer rigs.

Various such trailers may be adapted to transport materials exhibiting fluid behavior. For example, tank trailers may be adapted to carry large volumes of liquids and/or gases. LPG tank trailers may, for example, be adapted to carry liquids including liquefied gases such as, by way of example and not limitation, liquid ammonia, propane, propylene, dimethyl ether, isobutane, or butadiene. When loaded, an LPG tank trailer may easily exceed 36,000 pounds.

Various trailers, including LPG tank trailers, may be required to be equipped with air brakes activated and/or powered by compressed air (or other appropriate fluid). One or more air tanks may provide air to the air brakes. Auxiliary systems, such as lift axles, may also rely on compressed air.

SUMMARY

Apparatus and associated methods relate to a vehicle having independent fluid reservoirs for a fluid-activated brake system and at least one auxiliary fluid consumer. In an illustrative example, a first reservoir may be mounted above a chassis and outboard of a vehicle such that longitudinal axes of the reservoir and the vehicle are substantially aligned. The first reservoir may, for example, be fluidly coupled to a fluidly activated brake configured to brake at least one wheel on at least one axle of the vehicle and fluidly coupled to the first reservoir. At least one second reservoir may be fluidly coupled to at least one auxiliary fluid consumer of the vehicle such that the first reservoir is fluidly independent from the at least one second reservoir and the at least one auxiliary fluid consumer. Various embodiments may advantageously provide stable air supply for critical braking functions of the vehicle.

Various embodiments may achieve one or more advantages. For example, dedicated side-mounted air supply (SMAS) units may advantageously provide increased performance and/or safety for operation of air brakes and auxiliary pneumatic consumers (e.g., lift axles, air bags, air horns). Accordingly, for example, lift axles and air brakes may advantageously be operated individually or simultaneously without affecting pressure and/or flow of compressed air to each other. Independent air supply of auxiliary pneumatic consumers and air brakes may advantageously provide increased performance, increased reliability, increase safety, or some combination thereof. For example, independent reservoirs for braking and auxiliary functions may advantageously prevent mechanisms on a trailer that require air from compromising a volume required for a critical function (e.g., braking).

Various embodiments may, for example, advantageously provide a system that reduces transmission time from source reservoir to point of use. Such embodiments may, for example, advantageously decrease actuation time (e.g., to actuate a brake, actuate a lift axle). For example, a reduction in length of conduit between a reservoir and consumer may advantageously create a more rapid actuation of pneumatic and/or other fluid mechanisms (e.g., lifting suspensions off the ground, braking).

In some embodiments, for example, some (SMAS) embodiments may advantageously provide enhanced operator access (e.g., for maintenance, draining of accumulated condensation) to an air reservoir(s). Some SMAS embodiments may, for example, advantageously increase protection of the SMAS and associated fittings and fluid communication lines from environmental hazards (e.g., corrosive materials, snow, ice). In various embodiments, an SMAS(s) may advantageously provide increased air capacity (e.g., by using otherwise unutilized space on the side of the trailer).

Various embodiments may advantageously reduce air travel distance from a reservoir (e.g., SMAS) to a fluid consumer (e.g., air brakes, lift pistons). Accordingly, various embodiments may advantageously permit rapid response of systems depending on compressed air.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, an exemplary side-mounted air supply (SMAS) system is introduced with reference to FIGS. 1A-3. Second, that introduction leads into a description with reference to FIGS. 4-6 of some exemplary embodiments of SMASs, including exemplary implementations. Finally, the document discusses further embodiments, exemplary applications and aspects relating to SMAS apparatus, methods, and systems.

Figure 1A:
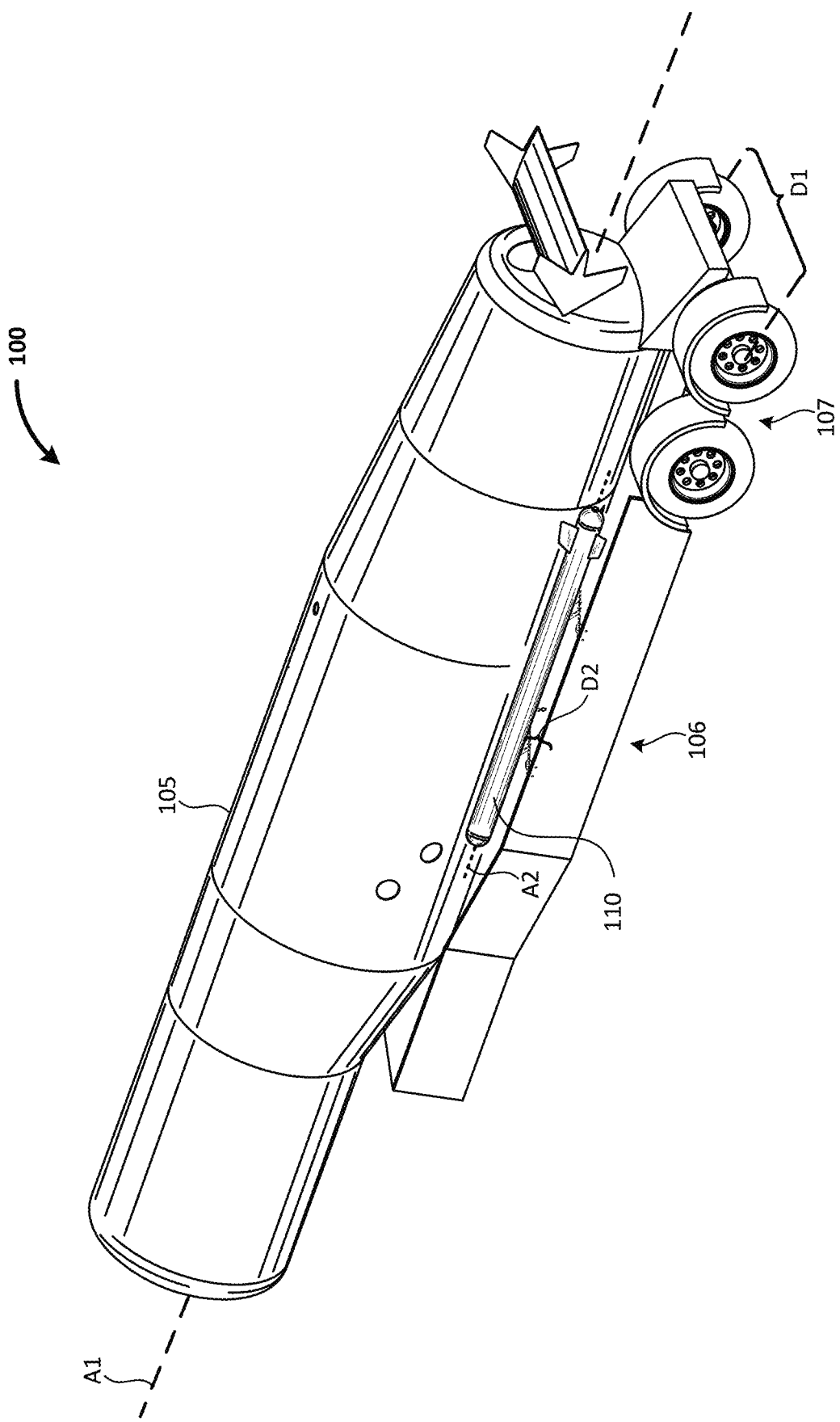
FIG. 1A depicts an exemplary side mounted air supply (SMAS 110) employed in an illustrative use-case scenario mounted on a tank trailer.
Figure 1B:
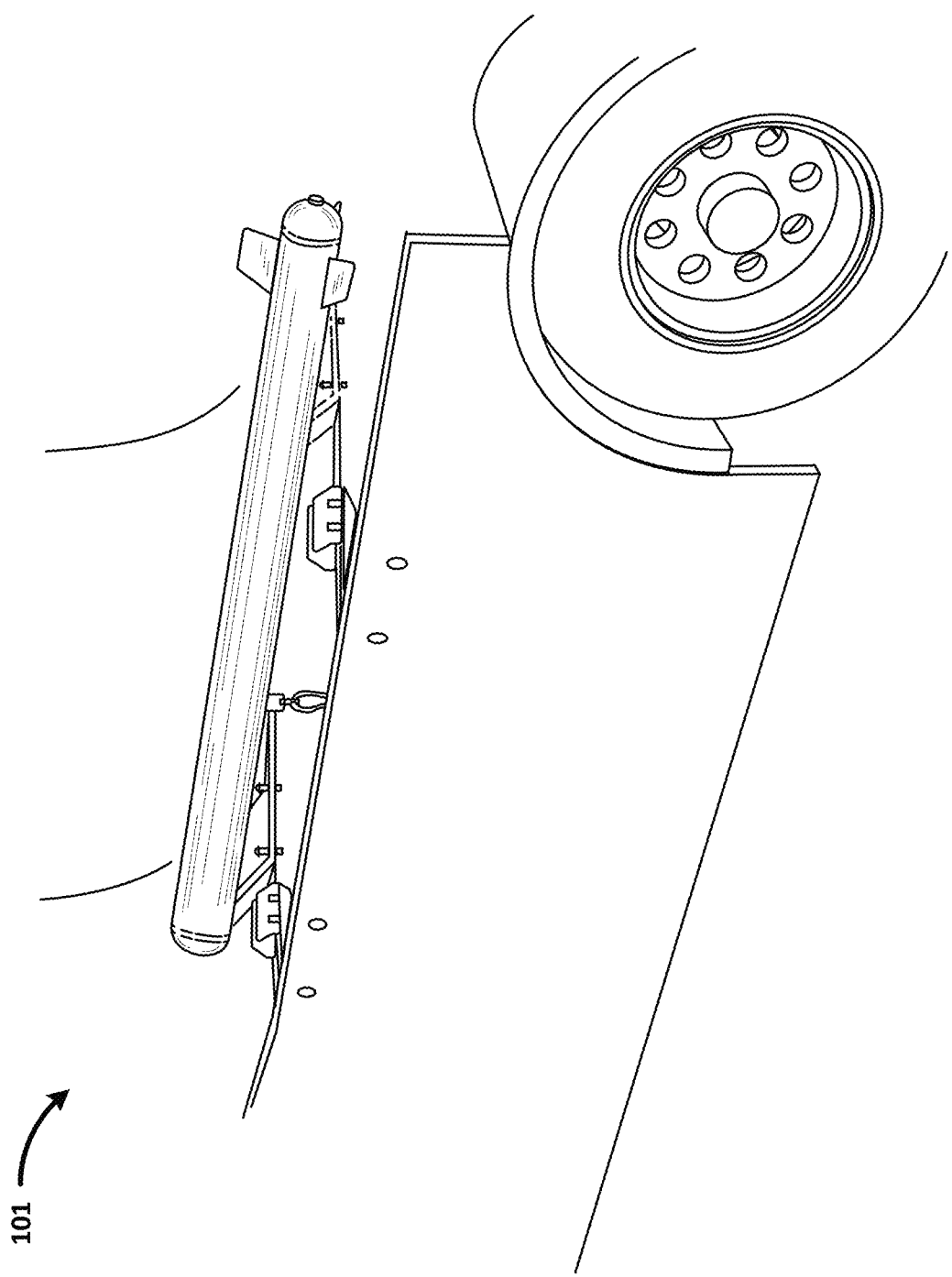
FIG. 1B depicts a closeup perspective view of the SMAS 110 of FIG. 1A.

FIG. 1A depicts an exemplary side mounted air supply (SMAS 110) employed in an illustrative use-case scenario 100 mounted on a tank trailer. FIG. 1B depicts a closeup perspective view 101 of the SMAS 110 of FIG. 1A. A tank trailer 105 (e.g., an LPG tank trailer) is provided with at least one SMAS 110. As depicted, the SMAS 110 is mounted along a side of the trailer 105. In various embodiments, side placement may advantageously provide enhanced operator access to the SMAS 110 (e.g., for maintenance, draining of accumulated condensation), protection of the SMAS and associated fittings and fluid communication lines from environmental hazards (e.g., corrosive materials, snow, ice), increased air capacity (e.g., by using otherwise unutilized space on the side of the trailer), or some combination thereof.

In the depicted example, the trailer 105 is supported by a chassis 106 (depicted in FIGS. 1A-1B as being at least partially covered by aerodynamic skirting). The chassis 106 is coupled to axles 107. The axles 107, as depicted, have a suspension width D1 (e.g., outside of hub to outside of hub).

As depicted, the SMAS 110 is mounted a vertical distance D2 from the chassis 106. As depicted, D2 is less than half of D1 from the chassis. In some embodiments, D2 may be limited to less than half of D1. In some embodiments, a D2' may be measured from a ground surface (e.g., a plane defined by contact of the tires with the ground). D2' may, for example, be limited to less than half of D1.

The body of the trailer 105 extends along a longitudinal axis A1. The SMAS 110 extends along a longitudinal axis A2. As depicted, when mounted, the A2 is aligned substantially parallel to the A1. In some embodiments, by way of example and not limitation, A2 may be within ±5 degrees of A1. For example, in some embodiments, A2 may be within ±3 degree of A1. In some embodiments, for example, A2 may be within ±2 degrees of A1. For example, A2 may be within ±1 degree of A1.

Figure 2:
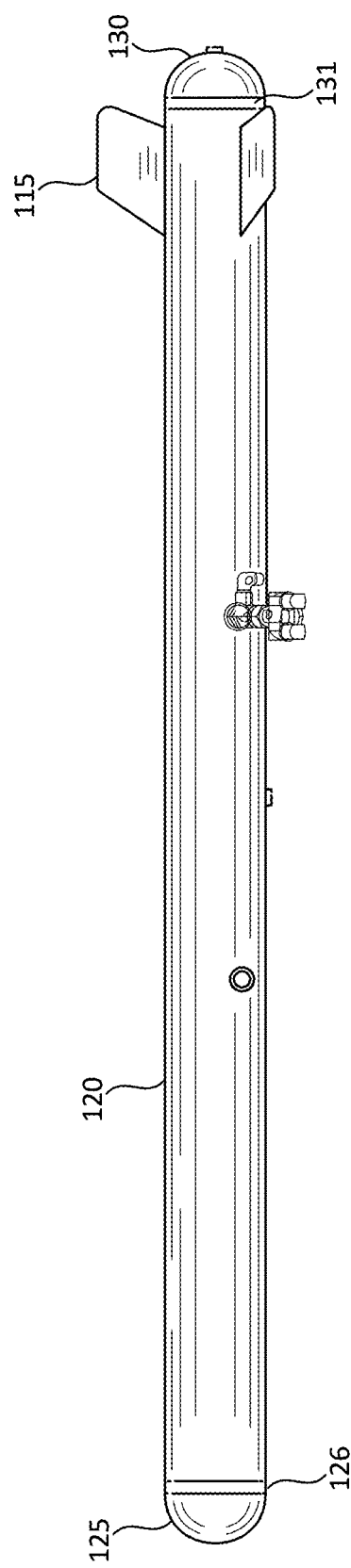
FIG. 2 depicts a side view of the exemplary SMAS 110 of FIGS. 1A-1B.

FIG. 2 depicts a side view of the exemplary SMAS 110 of FIGS. 1A-1B. As depicted, the SMAS 110 includes a body 120, a front cap 125, and a rear cap 130. The front cap 125 may, as depicted, be assembled to the body 120 by a weld seam 126. The rear cap 130 may, as depicted, be assembled to the body 120 by a weld seam 131. In some embodiments, by way of example and not limitation, the front cap 125, the rear cap 130, and/or the body 120 may be spun-formed. In some embodiments, the front cap 125, the rear cap 130, and/or the body 120 may, for example, be drawn. In some embodiments, for example, the body 120 may be extruded, for example. In some embodiments, by way of example and not limitation, the front cap 125 and/or the rear cap 130 may be formed continuously with (e.g., from a same piece of material, during a same forming process) with the body 120.

The front cap 125, the body 120, and the rear cap 130 may define at least one interior cavity. The interior cavity may, for example, be configured to hold fluid such as, by way of example and not limitation, compressed air.

A plurality of fins 115 may, as depicted, be disposed about the SMAS 110. In various embodiments the fins 115 may, for example, provide aerodynamic improvements (e.g., to coalesce air flow about the SMAS 110 into streamlines). In some embodiments, as depicted, the SMAS 110 may, by way of example and not limitation, provide a (predetermined) aesthetic exterior configuration. For example, as depicted, the fins 115 may be configured to give the SMAS 110 an appearance of a missile, torpedo, rocket, or other projectile.

Figure 3:
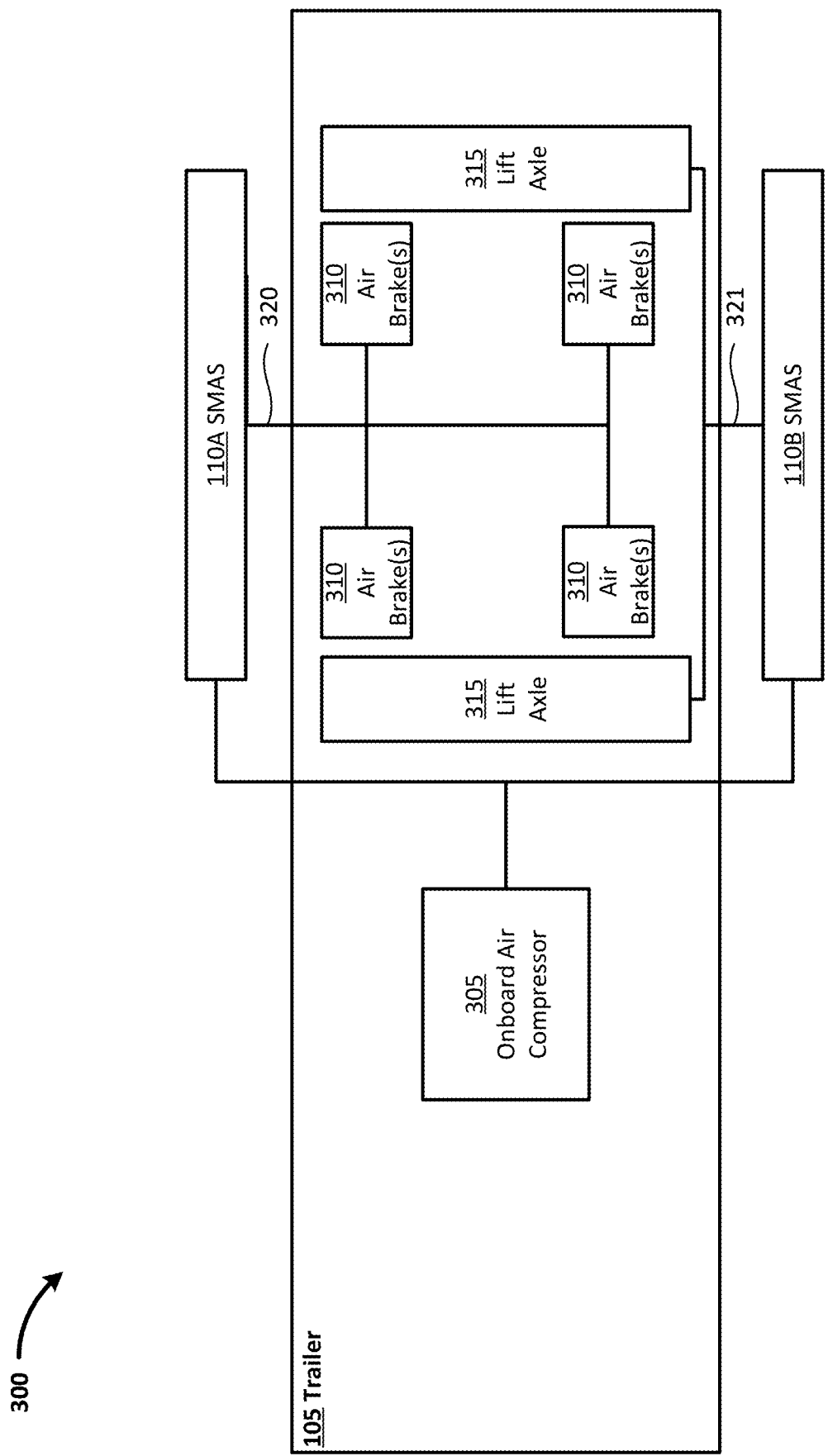
FIG. 3 depicts an exemplary fluid path schematic of a plurality of exemplary SMAS 110 units implemented to provide independent braking and wheel lift functions.

FIG. 3 depicts an exemplary fluid path schematic of a plurality of exemplary SMAS 110 units implemented to provide independent braking and wheel lift functions. In the depicted block diagram 300, a trailer 105 is provided with a first SMAS 110A and a second SMAS 110B. The trailer 105 is provided with an onboard air compressor 305. The onboard air compressor 305 is connected to the SMAS 110 and the SMAS 110B to provide compressed air thereto. The trailer 105 is further provided with multiple air brakes 310. The air brakes 310 may, for example, control braking of one or more wheels of the trailer 105. The SMAS 110A is connected via conduit(s) 320 to the air brakes 310 to provide compressed air thereto. For example, the SMAS 110A may activate and/or power the air brake 310. In some embodiments, by way of example and not limitation, multiple SMAS 110A may be connected to one or more air brakes 310. For example, air brake units for one axle may be connected to a single SMAS 110A.

In some embodiments, air brake units may be divided between multiple SMAS 110A (e.g., on opposite sides of the trailer 105). Such embodiments may, for example, be configured to maintain a maximum conduit length from the SMAS 110A to an air brake 310. For example, in some embodiments, a maximum conduit length from the SMAS 110A to an air brake 310 may be limited to D1. In some embodiments, a maximum conduit length may be limited to half of D1.

The trailer 105 is further provided with at least one lift axle 315. The lift axle 315 may, for example, provide a plurality of selectively engageable wheels. In various embodiments the lift axle 315 may be configured, for example, to support the trailer during relatively straight travel, and to be lifted such that the wheels are disengaged from a road while the trailer 105 is turning. The SMAS 110B is connected via conduit(s) 321 to provide compressed air to the lift axles 315. The SMAS 110B may, for example, control and/or power the lift axles 315.

In various embodiments dedicated SMAS units may advantageously provide increased performance and/or safety for operation of the air brakes 310 and the lift axle 315. For example, in the depicted implementation, the dedicated SMAS 110A is provided for the air brake 310 and the dedicated SMAS 110B is provided for the lift axle 315. Accordingly, the lift axle 315 and the air brake 310 may advantageously be operated individually or simultaneously without affecting pressure and/or flow of compressed air to each other. Independent air supply of the lift axle 315 and the air brake 310 may advantageously provide increased performance, increased reliability, increase safety, or some combination thereof.

In various embodiments dedicated SMAS units for air brakes and/or lift axles may allow for dynamic operation of lift axles during travel. As an example, slow response times of lift axles with conventional air supply systems may require drivers to slow down nearly to a stop before turning to allow time for the lift axles to be retracted from the road.

This slow response time may, for example, require a driver to impede traffic and/or may prevent a driver from (fully) retracting a lift axle during a sudden turn, thereby inducing potentially hazardous situations.

In a particular test embodiment, a lift axle was connected to a dedicated SMAS fitted with high flow air fittings and valves. In this embodiment, the lift axle was able to be retracted in approximately ¼ of the time required by conventional lift axle configurations. Accordingly, various embodiments may advantageously provide for rapid operation of lift axles, may provide for increased reliability of air brakes (e.g., by not sharing an air supply with an auxiliary function such as a lift axle), may increase safety to the driver and/or the public, may decrease risk of loss (e.g., to a company, insurance provider), or some combination thereof.

In some embodiments, lift axles may be divided between multiple SMAS 110B (e.g., on opposite sides of the trailer 105). Such embodiments may, for example, be configured to maintain a maximum conduit length from the SMAS 110B to a lift axle 315. For example, in some embodiments, a maximum conduit length from the SMAS 110B to a lift axle 315 may be limited to D1. In some embodiments, a maximum conduit length may be limited to half of D1.

Figure 4:
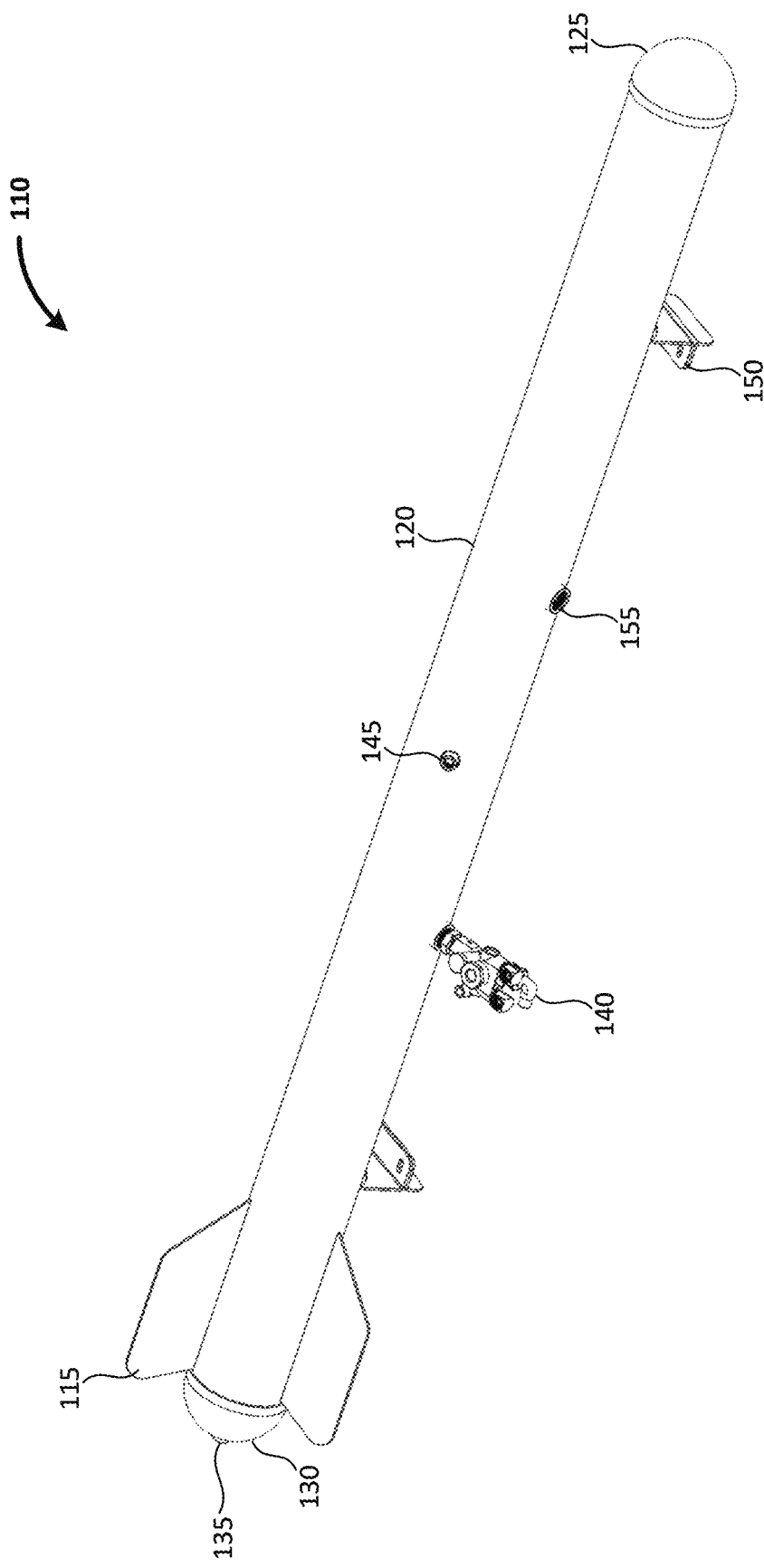
FIG. 4 depicts an exemplary SMAS 110 provided with exemplary access ports and fittings.

FIG. 4 depicts an exemplary SMAS 110 provided with exemplary access ports and fittings. The SMAS 110 is provided with plurality of ports for fluid communication. The rear cap 130 is provided with the fluid port 135. The body 120 is provided with fluid fittings 140 (e.g., for fluid communication), a fluid port 145, and a fluid port 155. The fluid port 145 may, for example, be configured to receive a drain fitting. The drain fitting may, for example, allow an operator to easily drain condensation out of the SMAS 110, as necessary. The fluid port 155 may, for example, be configured to connect the SMAS 110 to a source of compressed air. The fluid fittings 140 may fluidly communicate via a port with an interior of the SMAS 110 to provide air to at least one air consumer (e.g., air brakes, lift axle). in various embodiments the fluid fittings 140 may include one or more valves. In various embodiments valves and or fittings may be configured to accommodate a high rate of flow. Accordingly, various embodiments may advantageously permit rapid response of systems depending on compressed air.

Brackets 150 may, for example, be configured to mount to existing chassis (e.g., frame) members of a vehicle. In some embodiments, brackets 150 may be configured at an angle (e.g., as shown in FIG. 1A and FIGS. 5-6).

Figure 5:
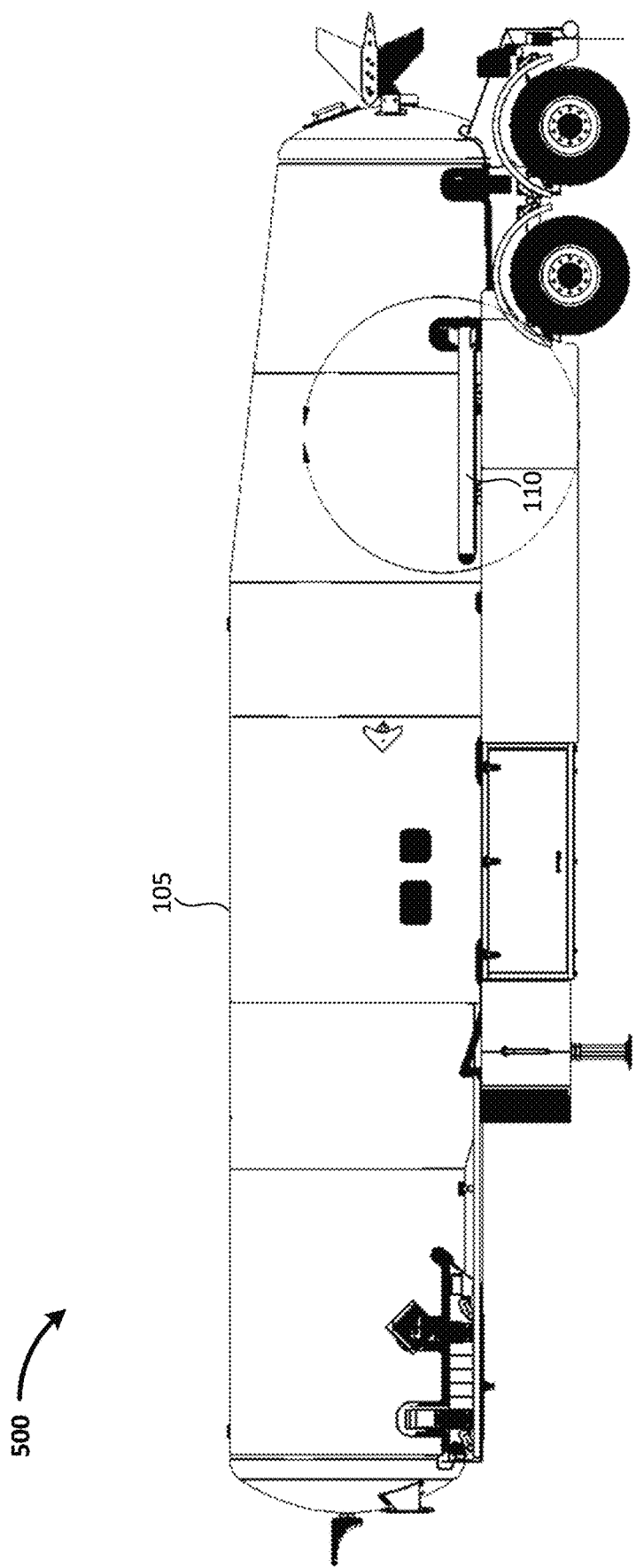
FIG. 5 depicts the exemplary SMAS 110 of FIG. 3 in an illustrative use-case scenario mounted on a tank trailer.
Figure 6:
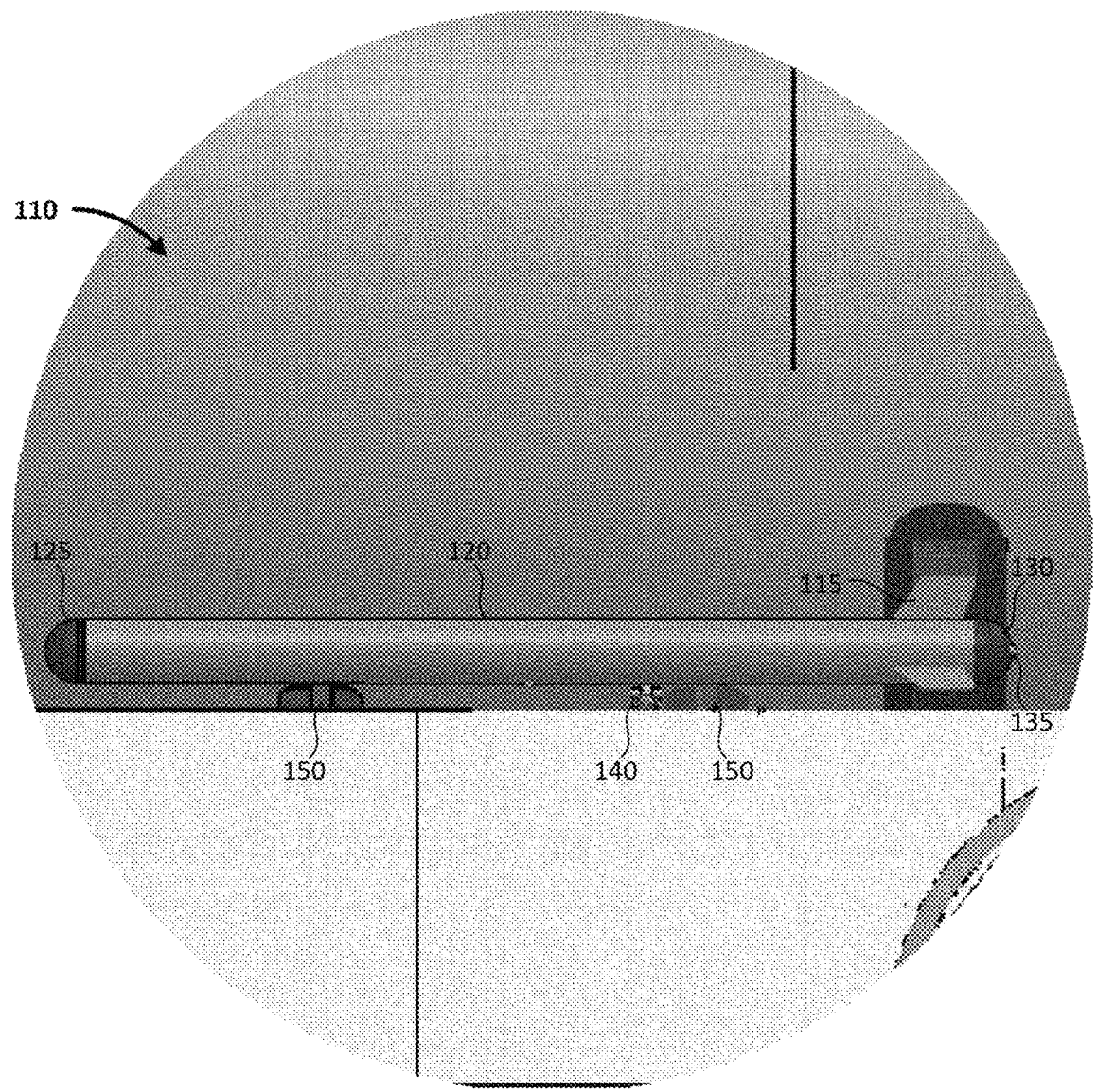
FIG. 6 depicts a closeup view of the exemplary SMAS 110 of FIG. 4 in the illustrative use-case scenario.

FIG. 5 depicts the exemplary SMAS 110 of FIG. 3 in an illustrative use-case scenario mounted on a tank trailer. FIG. 6 depicts a closeup view of the exemplary SMAS 110 of FIG. 4 in the illustrative use-case scenario. In the depicted exemplary tank trailer system 500, a tank trailer 105 is provided with at least one SMAS 110. FIG. 6 depicts a closeup view of the exemplary SMAS 110 of FIG. 4 in the illustrative use-case scenario. The SMAS 110 may, for example, be similar to that described in relation to FIGS. 1A-4. The SMAS 110 is mounted to the trailer 105 by a plurality of brackets 150. The brackets 150 may, by way of example and not limitation, be welded, bolted, screwed, riveted, strapped, or otherwise releasably or permanently coupled to the SMAS 110 (e.g., to the body 120). Accordingly, the SMAS 110 may be advantageously mounted to a side of the trailer 105.

Although various embodiments have been described with reference to the figures, other embodiments are possible. For example, although an exemplary system has been described with reference to the figures, other implementations may be deployed in other industrial, scientific, medical, commercial, and/or residential applications.

In some embodiments, an LPG tank trailer may be provided, for example, with an SMAS (e.g., SMAS 110). The tank trailer may be provided with a plurality of structural members extending laterally outwards (e.g., from a chassis). The structural members may, for example, be configured to support a wind skirt. The SMAS may be provided with a plurality of brackets. The brackets 150 may be, for example, coupled (e.g., bolted, screwed, riveted, welded) to the structural members. Accordingly, the SMAS may be advantageously mounted, for example, to a lower side (e.g., below a vertical midline) of the tank trailer.

The SMAS may be provided with a drain port. The drain port may, for example, be positioned on an underside of the SMAS and provide fluid communication between the external environment and an inner cavity (e.g., defined by the body 120, front cap 125, and rear cap 130). The drain port may be provided with a pull member (e.g., cord loop such as depicted in FIG. 1A). Accordingly, a user may advantageously drain accumulated condensation out of the SMAS by operating the drain port from a standing position, and without crawling under the trailer. Various embodiments may advantageously promote increased maintenance (e.g., condensation draining, air fitting inspection) such as, for example, due to the enhanced visibility of and operator access to the SMAS(s). Accordingly, various embodiments may advantageously reduce failure (e.g., freeze-up of air systems due to freezing of condensation in tanks, fittings, lines; undetected leakage; undetected corrosion); extend operating life; increase reliability (and, accordingly, safety of the driver and the public); or some combination thereof.

For example, in various embodiments, an air system may include one or more SMAS, each connected to one or more air supply and one or more air consumers. Various embodiments may advantageously provide increased air capacity. For example, various embodiments may advantageously utilize otherwise unused space to add air capacity without requiring costly/time-consuming redesign of a structure (e.g., trailer, vehicle). In various embodiments, SMAS units may be disposed on both sides of a trailer, in an array along one side of a trailer (e.g., multiple units positioned vertically and/or horizontally on at least one side), or some combination thereof. Accordingly, various embodiments may advantageously provide cost-effective expansion of air capacity. Increased air capacity may advantageously provide increased reliability of systems requiring compressed air, additional features relying on compressed air, or some combination thereof.

Various embodiments may be configured for modular addition of features during manufacturing. For example, a predetermined SMAS configuration may be provided for an individual axle (e.g., braking and/or lifting). A customer may, for example, order a trailer with a certain axle configuration (e.g., 3 lift axles, braking on all axles). The manufacturer may install a corresponding configuration of SMAS positioned along one or both sides of the trailer. Accordingly, various embodiments may advantageously allow a manufacturer to increase customization ability, decrease manufacturing time, and/or decrease manufacturing cost by providing modular configuration in place of requiring per-trailer air tank design and/or sourcing.

In various embodiments, a single SMAS unit (e.g., body 120 and caps 125 and 130) may have one or more cavities. For example, an SMAS may include a single continuous compartment configured to hold fluid. An SMAS may, for example, be provided with a plurality of interconnected or independent compartments. Compartments may, for example, be connected in parallel and/or series. Various compartments may be completely independent of one another. In various embodiments, for example, a single SMAS may be configured for a single axle and may provide one compartment dedicated to braking functions and one compartment dedicated to lifting functions. In various embodiments, for example, a single SMAS may be configured with independent compartments for a single function (e.g., lifting, braking) to a plurality of axles.

In various embodiments an SMAS may be modularly constructed. For example, multiple body portions (e.g., appearing as a segment of body 120) may be connected together to form an arbitrary length SMAS. End portion(s) may be provided. The end portions may, for example, correspond to 125// and/or 130//. A portion (e.g., a body portion and/or end portion) may be provided with (decorative) features (e.g., fins 115). Various sections may be configured to be coupled together (e.g., interlocked, welded, bolted, screwed, riveted). Various sections may be provided with configurable fluid communication ports (e.g., in ends of sections such as to provide fluid communication between sections), removable ends (e.g., to assemble multiple sections together to form a single compartment), ports to an external environment (e.g., for receiving fluid, dispensing fluid, drain fittings, valves), or some combination thereof. Accordingly, various embodiments may provide for achieving economy of scale in manufacturing components (e.g., individual sections) while allowing for rapid and cost-effective customization by rapid assembly of modular components.

In various embodiments, a particular SMAS may be made of one or more suitable materials. Materials may include, by way of example and not limitation, metal. In some embodiments, composites may be used (e.g., carbon fiber, fiberglass). Fluid communication ports and/or fittings may be integrally formed, welded in, or some combination thereof. Fluid fittings may, for example, be integrally formed and/or may be custom and/or standard off-the-shelf components.

In various embodiments, a ratio between a diameter of the SMAS (e.g., a diameter of body 120) and an overall length of the SMAS 110 (e.g., from front cap 125 to rear cap 130) may be predetermined. For example, in some embodiments, a ratio of length:diameter may be at least 5:1. In some embodiments, (e.g., as depicted in FIG. 1A) the ratio may be at least 10:1. In some embodiments, the ratio may be at least 12:1. In some embodiments, by way of example and not limitation, the ratio may be at least 15:1. Some embodiments may, for example, have the ratio at least 20:1.

In some embodiments, for example, the ratio may be determined such that access ports may be positioned along a length. Such embodiments may, for example, advantageously reduce a conduit distance from the SMAS to an air consumer (e.g., brakes, air bags, lift axles), such as by linearly distributing the air ports along a longitudinal axis of the SMAS (e.g., A2) substantially parallel to a longitudinal axis of the vehicle (e.g., A1).

For example, in some embodiments the SMAS may be configured and/or positioned such that a conduit length from the SMAS to a consumer (e.g., 'supply conduit') is, by way of example and not limitation, a maximum of 10 feet in length. Some embodiments may, for example, be configured to have a 7-foot maximum supply conduit length. In some embodiments, for example, a time of travel of the fluid from the SMAS to a consumer may be reduced by, for example, up to 10 times relative to traditional hub-and-spoke pneumatic distributions.

Although various embodiments have been described with reference to figures illustrating dual axles, other embodiments are contemplated. For example, some embodiments may have at least 3 axles. In some embodiments, one or more fixed axles may be used (e.g., with air bags, without air bags). In some embodiments, at least one lift axle may be included. In some embodiments, multiple lift axles and/or multiple fixed axles may be combined. For example, some embodiments may have at least 4 axles. Some embodiments may, for example, have at least 5 or more axles. Such embodiments may, for example, have proportionally longer SMAS and/or multiple SMASs (e.g., one or more on each side of the trailer). Such embodiments may, for example, be configured based on a maximum air travel time and/or maximum conduit length.

Although an exemplary system has been described with reference to the figures, other implementations may be deployed in other industrial, scientific, medical, commercial, and/or residential applications. For example, one or more SMAS 110 units may be provided on tank trailers, cargo trailers, flatbed trailers, dump trailers, pumping trailers, recreational trailers, and/or other trailers. SMAS unit(s) may, by way of example and not limitation, be integrated (releasably and/or unitarily) into trailers, vehicles (e.g., tank trucks, pickups, cars, vans, cargo trucks, dump trucks, airplanes, helicopters, boats), or some combination thereof. In various embodiments individual and/or interconnected SMAS units may provide various functions including, by way of example and not limitation, braking, lift axles, air horns, air suspension, winterization, fuel delivery, breathing air (e.g., in emergency vehicles), or some combination thereof. Various embodiments may be configured to receive and/or dispense dry fluid (e.g., powders with fluid behavior), gases (e.g., oxygen, nitrogen, flammable gases), liquids (e.g., water, fuel, firefighting fluids), or some combination thereof.

In an illustrative aspect, a vehicle may include a vehicle body extending along a longitudinal axis. The vehicle may include a chassis coupled to and supporting the vehicle body. The vehicle may include multiple axles coupled to and supporting the chassis. The vehicle may include a pneumatically activated brake configured to selectively brake at least one of the plurality of axles. The vehicle may include a first air reservoir extending along a longitudinal axis, the first air reservoir being mounted outboard of the vehicle body, substantially parallel with the longitudinal axis, and above the chassis of the vehicle. The first air reservoir may be fluidly coupled as a fluid source to the pneumatically activated brake. The vehicle may include an auxiliary pneumatic consumer. The vehicle may include at least one second air reservoir fluidly coupled as a fluid source to the auxiliary pneumatic consumer such that the first air reservoir is fluidly independent from the at least one second air reservoir and the auxiliary pneumatic consumer.

The vehicle body may include a tank of a trailer. The chassis may include a trailer chassis. The auxiliary pneumatic consumer may include a lifting mechanism configured to selectively lift at least one of the plurality of axles.

The at least one second air reservoir may be mounted above the chassis and outboard of the vehicle body. The first air reservoir may be mounted such that a vertical distance from the chassis to the first air reservoir is less than half of a suspension width of the vehicle.

A total length of the first air reservoir may be at least five times longer than a maximum width of the first air reservoir. The first air reservoir may include stabilizing fins mounted on an exterior surface of the first air reservoir. An exterior surface of the first air reservoir and the stabilizing fins may be configured such that the first air reservoir gives an appearance of a projectile.

A fluid system may include a first fluid reservoir extending along a first longitudinal axis. The first fluid reservoir may be mounted above a chassis of a vehicle and outboard of the vehicle extending along a second longitudinal axis such that the first longitudinal axis is substantially parallel with the second longitudinal axis. The fluid system may include a fluidly activated brake configured to brake at least one wheel on at least one axle of the vehicle and fluidly coupled to the first fluid reservoir. At least one second fluid reservoir may be fluidly coupled to at least one auxiliary fluid consumer of the vehicle such that the first fluid reservoir is fluidly independent from the at least one second fluid reservoir and the at least one auxiliary fluid consumer.

The vehicle may include a tank trailer and the first fluid reservoir is mounted outboard of a body of the tank trailer.

The first fluid reservoir may be an air reservoir. The fluidly activated brake may include a pneumatically activated brake. The at least one auxiliary fluid consumer may include a pneumatic lifting mechanism configured to selectively lift at least one axle of the vehicle.

The at least one second fluid reservoir may be mounted above the chassis and outboard of a body of the vehicle. The first fluid reservoir may be on a first side of the vehicle. The at least one second fluid reservoir may be mounted on an opposing side of the vehicle.

The first fluid reservoir may be mounted such that a vertical distance from the chassis to the first fluid reservoir is less than half of a suspension width of the vehicle.

A total length of the first fluid reservoir may be at least five times longer than a maximum width of the first fluid reservoir.

The first fluid reservoir may include stabilizing fins mounted on an exterior surface of the first fluid reservoir. An exterior surface of the first fluid reservoir and the stabilizing fins may be configured such that the first fluid reservoir gives an appearance of a projectile.

The first fluid reservoir may be fluidly coupled to the fluidly activated brake by a conduit. A length of the conduit may be less than a suspension width of the vehicle. A length of the conduit may be less than half a suspension width of the vehicle.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A vehicle comprising:
   a vehicle body extending along a longitudinal axis;
   a chassis coupled to and supporting the vehicle body;
   a plurality of axles coupled to and supporting the chassis;
   a pneumatically activated brake configured to selectively brake at least one of the plurality of axles;
   a first air reservoir extending along a longitudinal axis, the first air reservoir being mounted outboard of the vehicle body such that the longitudinal axis of the first air reservoir is substantially parallel with the longitudinal axis of the vehicle body, and above the chassis of the vehicle, the first air reservoir being fluidly coupled as a fluid source to the pneumatically activated brake;
   an auxiliary pneumatic consumer; and,
   at least one second air reservoir fluidly coupled as a fluid source to the auxiliary pneumatic consumer such that the first air reservoir is fluidly independent from the at least one second air reservoir and the auxiliary pneumatic consumer.

2. The vehicle of claim 1, wherein the vehicle body comprises a tank of a trailer.

3. The vehicle of claim 1, wherein the chassis comprises a trailer chassis.

4. The vehicle of claim 1, wherein the auxiliary pneumatic consumer comprises a lifting mechanism configured to selectively lift at least one of the plurality of axles.

5. The vehicle of claim 1, wherein the at least one second air reservoir is mounted above the chassis and outboard of the vehicle body.

6. The vehicle of claim 1, wherein the first air reservoir is mounted such that a vertical distance from the chassis to the first air reservoir is less than half of a suspension width of the vehicle.

7. The vehicle of claim 1, wherein a total length of the first air reservoir is at least five times longer than a maximum width of the first air reservoir.

8. The vehicle of claim 1, wherein the first air reservoir comprises stabilizing fins mounted on an exterior surface of the first air reservoir.

9. The vehicle of claim 8, wherein the exterior surface of the first air reservoir and the stabilizing fins are configured such that the first air reservoir gives an appearance of a projectile.

10. A fluid system comprising:
    a first fluid reservoir extending along a first longitudinal axis, the first fluid reservoir being mounted above a chassis of a vehicle and outboard of the vehicle extending along a second longitudinal axis such that the first longitudinal axis is substantially parallel with the second longitudinal axis; and,
    a fluidly activated brake configured to brake at least one wheel on at least one axle of the vehicle and fluidly coupled to the first fluid reservoir;
    wherein at least one second fluid reservoir is fluidly coupled to at least one auxiliary fluid consumer of the vehicle such that the first fluid reservoir is fluidly independent from the at least one second fluid reservoir and the at least one auxiliary fluid consumer.

11. The fluid system of claim 10, wherein the vehicle comprises a tank trailer and the first fluid reservoir is mounted outboard of a body of the tank trailer.

12. The fluid system of claim 10, wherein the first fluid reservoir is an air reservoir and the fluidly activated brake comprises a pneumatically activated brake.

13. The fluid system of claim 10, wherein the at least one auxiliary fluid consumer comprises a pneumatic lifting mechanism configured to selectively lift at least one axle of the vehicle.

14. The fluid system of claim 10, wherein the at least one second fluid reservoir is mounted above the chassis and outboard of a body of the vehicle.

15. The fluid system of claim 14, wherein the first fluid reservoir is on a first side of the vehicle and the at least one second fluid reservoir is mounted on an opposing side of the vehicle.

16. The fluid system of claim 10, wherein the first fluid reservoir is mounted such that a vertical distance from the chassis to the first fluid reservoir is less than half of a suspension width of the vehicle.

17. The fluid system of claim 10, wherein a total length of the first fluid reservoir is at least five times longer than a maximum width of the first fluid reservoir.

18. The fluid system of claim 10, wherein the first fluid reservoir comprises stabilizing fins mounted on an exterior surface of the first fluid reservoir.

19. The fluid system of claim 18, wherein the exterior surface of the first fluid reservoir and the stabilizing fins are configured such that the first fluid reservoir gives an appearance of a projectile.

20. The fluid system of claim 10, wherein the first fluid reservoir is fluidly coupled to the fluidly activated brake by a conduit, wherein a length of the conduit is less than half a suspension width of the vehicle.

21. The fluid system of claim 10, wherein the first fluid reservoir is mounted laterally outboard of the chassis.

22. The fluid system of claim 10, wherein the first fluid reservoir is mounted on a first side of the vehicle and the at least one second fluid reservoir is mounted on an opposing side of the vehicle.

23. The fluid system of claim 10, wherein the first fluid reservoir and the at least one second fluid reservoir are positioned such that they are accessible to an operator from a standing position.

* * * * *